(12) United States Patent
Britton

(10) Patent No.: US 7,239,236 B1
(45) Date of Patent: Jul. 3, 2007

(54) WIRELESS SENSORS FOR ALARM SYSTEM OPERATIONS

(76) Inventor: Rick A. Britton, 4009 W. 150th St., Leawood, KS (US) 66224

( * ) Notice: Subject to any disclaimer, the term of this patent is extended or adjusted under 35 U.S.C. 154(b) by 363 days.

(21) Appl. No.: 10/919,027

(22) Filed: Aug. 16, 2004

Related U.S. Application Data

(60) Provisional application No. 60/496,063, filed on Aug. 16, 2003.

(51) Int. Cl.
*G08B 29/00* (2006.01)
(52) U.S. Cl. .............. 340/514; 340/825.36; 340/573.1; 340/539.22; 340/989
(58) Field of Classification Search ................ 340/514, 340/506, 501, 531, 539.1, 541, 527, 565, 340/539.14, 825.36, 825.71, 426.13, 429, 340/426.1, 539.22, 989, 573.1
See application file for complete search history.

(56) References Cited

U.S. PATENT DOCUMENTS

| | | | | | |
|---|---|---|---|---|---|
| 5,722,082 | A | * | 2/1998 | Schloemer | 455/509 |
| 6,040,770 | A | * | 3/2000 | Britton | 340/539.24 |
| 6,069,655 | A | * | 5/2000 | Seeley et al. | 348/154 |
| 6,166,627 | A | * | 12/2000 | Reeley | 340/426.25 |
| 6,211,783 | B1 | * | 4/2001 | Wang | 340/506 |
| 6,252,544 | B1 | * | 6/2001 | Hoffberg | 342/357.1 |
| 6,255,945 | B1 | * | 7/2001 | Britton | 340/539.24 |
| 6,271,752 | B1 | * | 8/2001 | Vaios | 340/541 |
| 6,570,496 | B2 | | 5/2003 | Britton | 340/506 |
| 6,650,238 | B1 | | 11/2003 | Britton | 340/539.1 |

* cited by examiner

*Primary Examiner*—Daniel Wu
*Assistant Examiner*—Daniel Previl
(74) *Attorney, Agent, or Firm*—Jonathan A. Bay

(57) ABSTRACT

A premise-monitoring alarm system has a base transceiver for a control panel and numerous distributed remote transceivers servicing the numerous distributed remote alarm-event sensors. Given remote transceivers are enhanced with a user-sensible indicator as well as a user interface. For installation purposes, a remote transceiver responds to a manual trigger through the interface with transmission of a test signal. The base transceiver responds to any within-range test signal with sending a reply signal. In turn, the sending-remote transceiver responds to reception of the reply signal with output of a user-sensible indication through the user-sensible indicator. That way, during installation, a single installer can determine when the two transceivers are within range without help from additional persons or equipment. Hence the installer can repetitiously test the sending-remote transceiver in various proposed installations within a confined remote perimeter, without ever having a desert area confined within the perimeter.

16 Claims, 9 Drawing Sheets

FIG. 7.
(PRIOR ART)

Client-Server model of
Network communications
in a Stateless protocol

Server CPU activities

| | | |
|---|---|---|
| 101 | Store minimal set of DLL objects | Secondary memory via DLLs |
| 102 | Store minimal Operating System | Secondary memory via DLLs |
| 103 | Store Application Source Program | Secondary memory via DLLs |
| 104 | Store Application Data Access programs | Secondary memory via DLLs |
| 105 | Store Network programs | Secondary memory via DLLs |
| 106 | Store Network Protocols | Secondary memory via DLLs |
| 107 | | |
| 108 | | |
| 109 | Store Application Data | Secondary memory via DLLs |
| 110 | Store Application First stage object with DLL references | Secondary memory via DLLs |
| 111 | Execute Operating System example Microsoft | Primary memory and Secondary memory via DLLs |
| 112 | Execute Network program using network protocols | Network card |
| 113 | | |
| 114 | Receive Request from Client | Network card |
| 115 | Analyze Request | Primary memory via DLLs |
| 116 | Select Requested Application First stage compile object and linked DLL object references | Primary memory and Secondary memory, via DLLs |
| 117 | Select Requested Data | Primary memory and Secondary memory, via DLLs |
| 118 | Transmit Requested Application First stage object with DLL references | Network card |
| 119 | Transmit Requested Application Data | Network card |
| 120 | | |
| 121 | | |
| 122 | | |
| 123 | | |
| 124 | | |
| 125 | | |
| 126 | | |
| 127 | Receive keystrokes/mouse clicks | Network card and Primary memory |
| 128 | Analyze keystrokes/mouse clicks | Primary memory via DLLs |

FIG. 8.
(PRIOR ART)

Client-Server model of
Network communications
in a Stateless protocol

Client CPU activities

| | | | |
|---|---|---|---|
| 201 | Store | DLL* Objects | Secondary memory via DLLs* |
| 202 | Store | Full and complex Operating System | Secondary memory via DLLs* |
| 203 | | | |
| 204 | Store | Application Data Access programs | Secondary memory via DLLs* |
| 205 | | | |
| 206 | Store | Network program | Secondary memory via DLLs* |
| 207 | Store | Network Protocols | Secondary memory via DLLs* |
| 208 | | | |
| 209 | Store | Requested Application Data set | Secondary memory via DLLs* |
| 210 | Store | Application First stage object with DLL references | Secondary memory via DLLs* |
| 211 | Execute | Operating System   example Microsoft | Primary memory and Secondary memory via DLLs* |
| 212 | | | |
| 213 | Execute | Network program using network protocols | Network card |
| 214 | | | |
| 215 | Send | Request for program service | Network card |
| 216 | Receive | Requested Application First stage object with DLL references | Network card |
| | | | Network card |
| 217 | Receive | Requested Application Data | Network card |
| 218 | | | |
| 219 | Execute | Application Second stage compile/interpretation to derive object and referenced DLL* | Primary memory and Secondary memory via DLLs* |
| 220 | Execute | Derivative code | Primary memory and Secondary memory via DLLs* |
| 221 | Execute | Data access | Primary memory via chip code |
| 222 | Develop | Screen images with data content | Primary memory and Secondary memory via DLLs* |
| 223 | Translate | Screen images   example HTML, XML etc. | Primary memory and Secondary memory via DLLs* |
| 224 | Display | Screen images | Primary memory and Secondary memory via DLLs* |
| | | | Video card |
| 225 | Collect | keystrokes/mouse clicks | Interface card |
| 226 | Transmit | keystrokes/mouse clicks | Network card |
| 227 | Store | keystrokes/mouse clicks | Interface card, Primary memory |
| 228 | Analyze | keystrokes/mouse clicks | Primary memory via DLLs* |

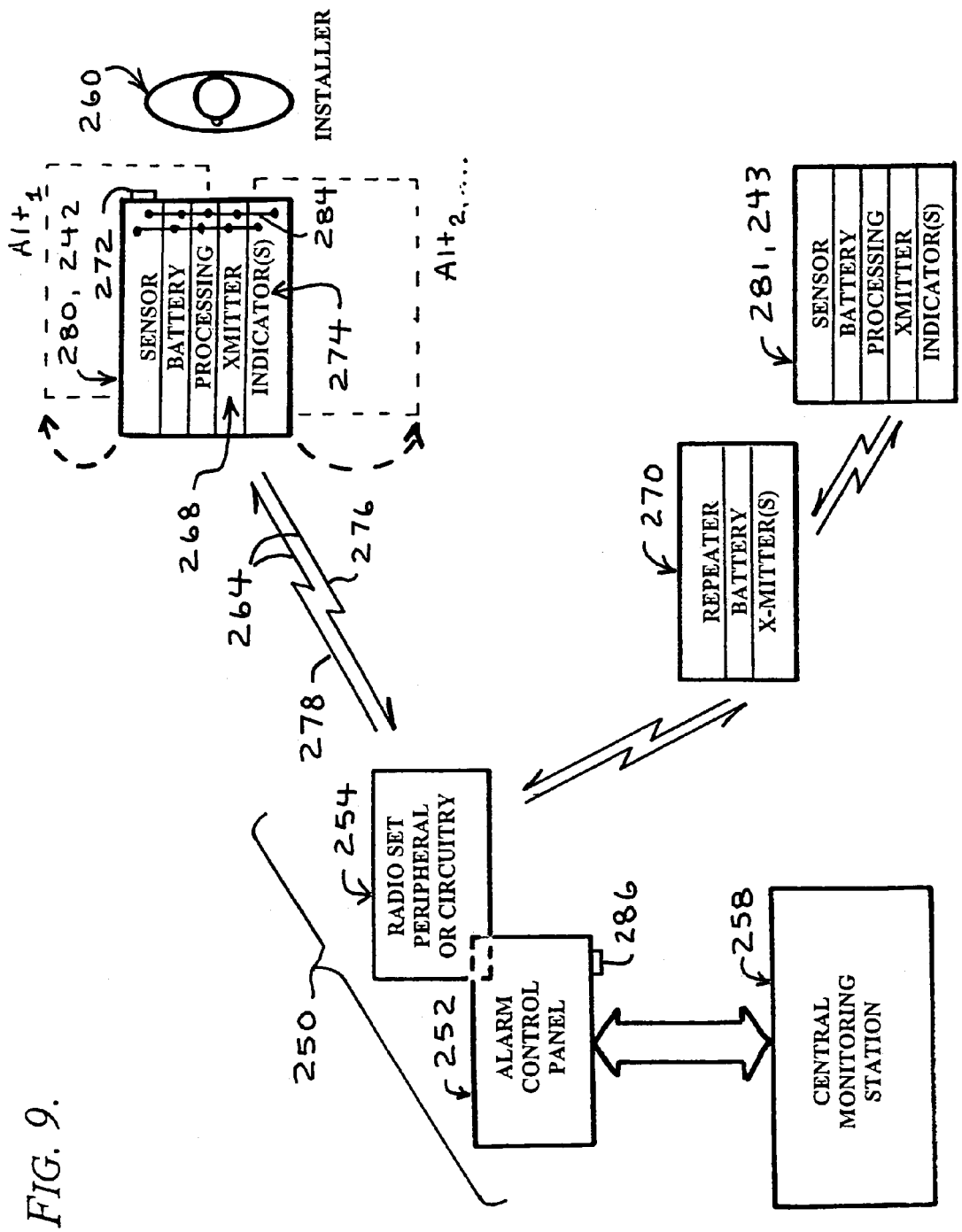

US 7,239,236 B1

WIRELESS SENSORS FOR ALARM SYSTEM OPERATIONS

CROSS-REFERENCE TO PROVISIONAL APPLICATION(S)

This application claims the benefit of U.S. Provisional Application No. 60/496,063, filed Aug. 16, 2003.

BACKGROUND OF THE INVENTION

1. Field of the Invention

The invention relates to automatic, premise-monitoring alarm system as for example burglary or burglary/firm alarm systems, and more particularly to network and circuit configurations for alarm system operations as will be apparent in connection with the discussion further below of preferred embodiments and examples.

2. Prior Art

Premise-monitoring alarm systems monitor a given protected premise—say, for example, a residential home, a commercial property, a bank vault, or an ATM machine and the like—for the occurrence of a given event:—e.g., an unwanted intrusion, unauthorized entry or smoke and so on. Some alarm events simply correspond to a "low battery" condition in either the alarm-event sensors or else the protected-premise controller/control panel. Upon detection of a given alarm event, the controller signals the alarm event to a pre-determined receiving site(s), which traditionally has been a central alarm-monitoring station. In the traditional case, the central alarm-monitoring station, which may be a public or private service, may manually process the signal by an attendant who can dispatch police or fire-fighters or alert the property-owners or take whatever other steps are appropriate. Prior art automatic alarm systems have typically transmitted their message traffic over standard voice-grade telephone lines.

FIG. 1 shows an alarm system configuration 50 in accordance with the prior art. This alarm system configuration includes video surveillance by means of camera 52. In FIG. 1, the example protected premise features a certain door 54. This door may be assumed to be a front door to a bank lobby or the like. The door may see heavy traffic during business hours. But after closing time or later, perhaps this door is intended to lock out all but a highly select few who have been given pre-assigned privileges to use the door during the very latest hours.

FIG. 1 includes representation of a guard shack 56. For this bank, it keeps a security guard 58 posted at the shack perhaps twenty-four hours, all seven days of the week. Presumptively, the guard shack is the central receiving site for multiple other alarm controllers, although the drawing shows just one controller 60. Also, presumptively, each alarm controller 60 is linked with multiple sensors, although again the drawing shows just one sensor 62. The protection of this door 54 might be sensitive enough that it justifies video monitoring as well.

The upper half of FIG. 1 provides a sample event table. In this table, a typical sequence of events might comprise the following. At some original time, the door is closed, the controller is armed, the sensor and camera are active, and the guard shack is staffed by a given guard (eg., "user"). The guard shack is provided with a video monitoring system 64 which includes among other things, one or more monitors, a video tape recorder 66, and a switch 68. The switch is used as follows. Perhaps the guard shack has an array of monitors, but perhaps also the guard shack is linked with tenfold as many cameras 62 as it has monitors. These multiple other camera links are shown in the drawing by reference numeral 72 (although the other cameras are not shown). Thus the guard cannot perpetually monitor the channel of all the cameras simultaneously. The guard must flip between channels. Indeed, the VMS 64 is likely to have an automatic sequencer that sequences through the channels of all the relevant cameras. Alternatively, the guard can of course preempt the sequencer and tune in on the channel of a specified camera as the guard wishes. With the foregoing in mind, it is assumed that, at the original time when the door 54 is closed, the guard is switched to channels other than this camera 52 shown by FIG. 1.

At event no. 1, the door opens. The motion sensor 62 detects this event. It signals the controller 60 over a copper wire connection 74. At event no. 2, the controller has started it response. The controller sends a control signal to the local VTR 76 over copper wire 78 to begin recording. The local VTR 76 responds to the control signal and switches ON, however the VTR 76 is linked to the camera by co-axial cable 78. The controller 60 concurrently counts out its pre-set delay time. That is, authorized users might be given twenty (20) seconds to get through the door 54 and over to the controller 60 to enter a password or code. Without a timely entry of an authorized password or code, the controller at event no. 4 signals the guard shack of the prospective alarm event. The link between the controller and guard shack might be achieved by a standard voice grade telephone line 80.

At event no. 5, the guard switches into the channel of this camera. To tune into this camera 52, the guard shack switch must have a co-axial link 82/78 extending directly back all the way to the camera 52 (more accurately, there is a hop at the local VTR 76). Indeed, the switch might be fed the co-axial infeeds of dozens if not hundreds of other cameras. Again, such other infeeds are indicated by reference numeral 72. Logistically, such an expansive grid of co-axial cable 72/78/82 represents substantial resources in installation and maintenance. By event no. 6, the guard begins his or her analysis of the situation, including by transmitting instructions to the camera vis-a-vis the controller, such as pan, zoom, or tilt and so on (hereinafter more simply referenced as PZT). Event no. 7 et seq. show that further analysis continues, with the controller 60 relaying the guard's instructions to the camera. The guard has likely begun recording with the guard shack VTR 66 as well.

There are various shortcomings associated with the prior art configuration(s) of combined alarm monitoring and video surveillance. Installing and maintaining the co-axial cable is costly. Preferably, the guard shack is rather centrally located among the distributed cameras. Cost factors in many cases limit the serviceable distance between the guard shack and any of its cameras it services. There is little economy in having one guard shack in a region service diverse remote properties. The logistics of carrying video signals over co-axial cable virtually proscribe one guard shack per property. Also, once a guard shack site has been chosen, and wired up, it is costly to change that choice and move the guard shack. It is also costly to establish a redundant site(s) as for either back-up purposes or joint analysis purposes by users at various ones of the remote sites simultaneously.

Also, the video data travels over special co-axial cables whereas the command signals travel over other hardwired paths, but not the co-axial cables. Hence there are redundant paths extending between the camera and most devices it feeds video to and/or receives commands from.

Accordingly, it is an object of the invention to overcome these and other shortcomings of the prior art and provide improved networks and circuits for alarm system operations. Additional aspects and objects of the invention will be apparent in connection with the discussion further below of preferred embodiments and examples.

SUMMARY OF THE INVENTION

It is an object of the invention to provide a 2-way radio link between a given battery-powered alarm-event sensor and a given premise-protecting control panel with various optimization features.

These and other aspects and objects are provided according to the invention in a premise-monitoring alarm system in accordance with the invention that comprises some of the following aspects. That is, it includes a base set, which comprises a package of circuitry and devices including a base transceiver as well as a control panel linked to the base transceiver. The inventive alarm system further includes at least one remote set (more likely, numerous remote sets, the one or two being shown in the FIG. 9 being representative of many more), which comprises a package of circuitry and devices including a remote transceiver as well as a sensor fairly closely located to the remote transceiver. Preferably the sensor is not radio linked to the remote transceiver but instead is preferably linked by physical conductors. The remote set further includes a user-sensible indicator, and a user interface, both which are preferably not radio linked to the remote transceiver but instead are preferably linked by physical conductors.

Preferably the remote set is configured to respond to a given user input, as inputted through the interface, with transmission of a test signal through the remote transceiver. Correspondingly, the base set is preferably configured to respond to reception of any within-range test signal with sending a reply signal.

It is an aspect of the invention that the remote set preferably responds to reception of a reply signal with output of a user-sensible indication by the sensible indicator. That way, during installation, a single installer can determine when the transceivers are within range without help from additional persons or equipment. Hence the installer can repetitiously test the remote transceiver in various proposed installations within a confined remote perimeter, without ever having to desert area confined within the perimeter.

It is a preferred option if the base set is further configured to receive as well as analyze any test signal within range. That way, in further response, the base set can encode the reply signal with information based on such analysis. The remote set is correspondingly further enhanced to decode the information in the reply signal and then thereafter respond with an output through the sensible indicator such a user-sensible indication that would convey or communicate that information to an installer. For example and without limitation, such information might correspond to the remote transceiver's sent-signal strength. Given the foregoing, during installation, a single installer can advantageously determine the information (eg., such as remote transceiver signal strength) without help from additional persons or equipment.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 7 is a table of server-side CPU activities in accordance with the prior art for a server participating in the prior art client-server model of network communications in a stateless communications-transfer protocol (eg., Web);

FIG. 8 is a table of server-side CPU activities in accordance with the prior art for a client participating in the prior art client-server model of network communications in a stateless communications-transfer protocol (eg., Web); and FIG. 9 is a diagrammatic view of an inventive method and devices therefor for optimizing installation position of a wireless sensor with respect to a base unit.

DETAILED DESCRIPTION OF THE PREFERRED EMBODIMENTS

Figure 2:
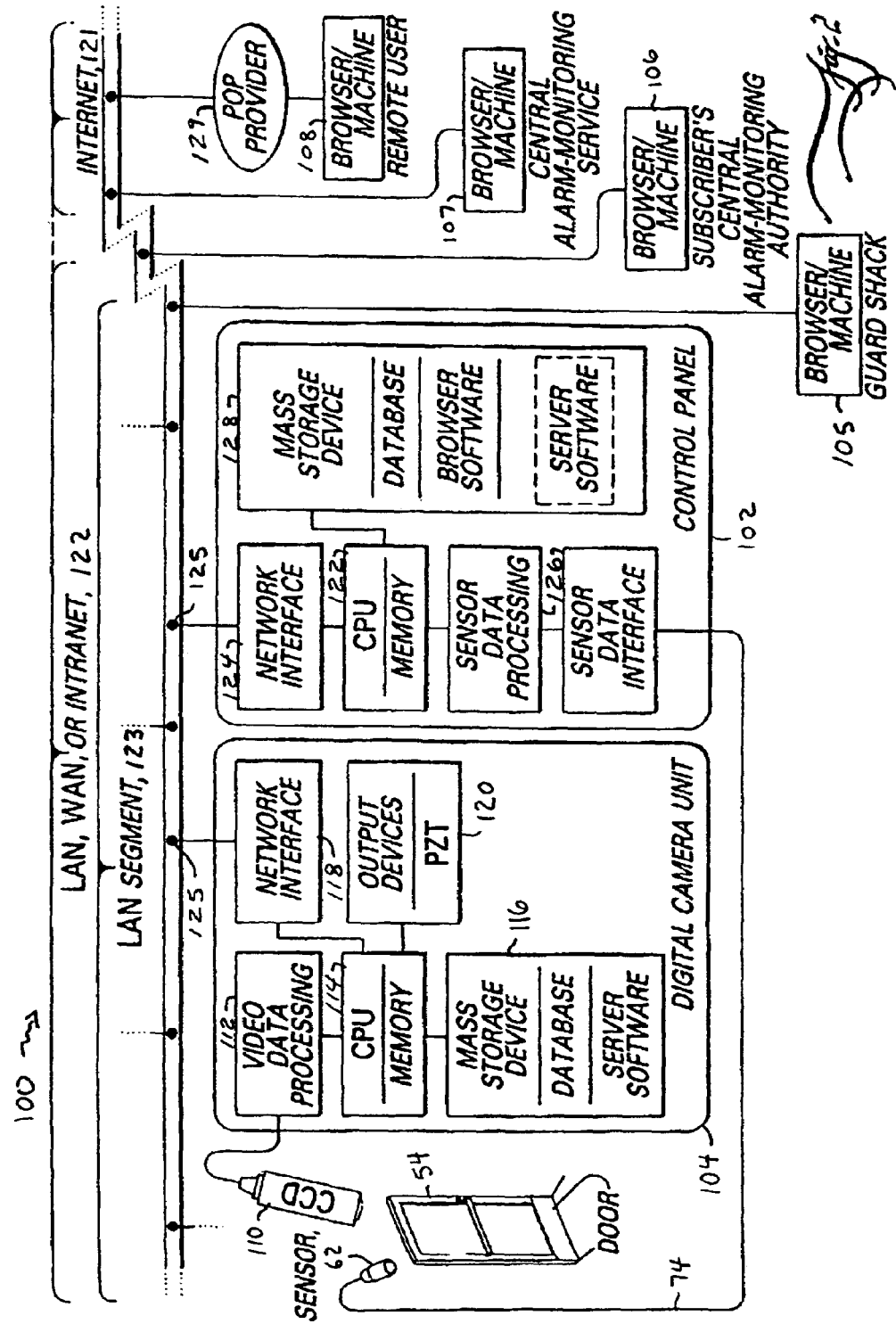
FIG. 2 is a diagrammatic view of an alarm system combined with video surveillance in accordance with the invention.

FIG. 2 gives a diagrammatic view of an alarm system 100 combined with video surveillance in accordance with the invention. A control panel 102 in accordance with the invention is situated among an array of cameras (only one camera 104 shown by the drawing) are linked by browser/server technology as will be discussed more particularly below in connection with FIGS. 6 through 8. The control panel is connected with any of various receiving sites 105-08 for its message communications by users likewise implemented with browser/server technology.

The control panel, camera and the remote receiving sites 105-08 can be linked up in various configurations including what may be referred to as inter-networking. The term "inter-networking" has apparently evolved to encompass the networking of networks, including where one such network might be the Internet global computer network.

Figure 1:
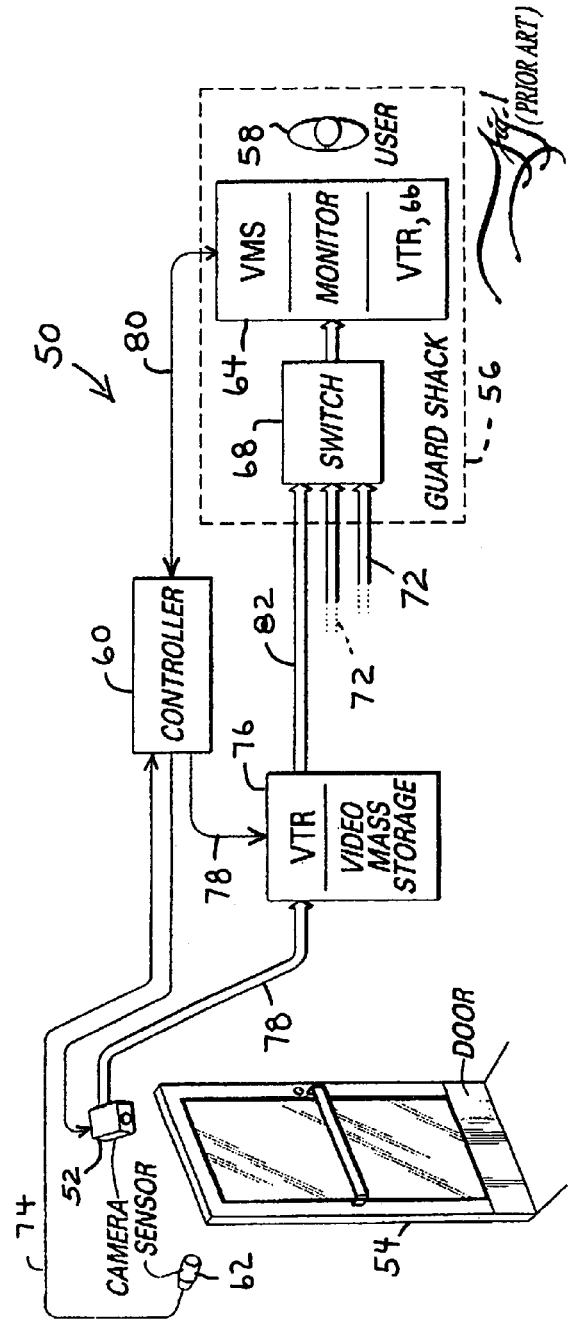
FIG. 1 is a diagrammatic view of an alarm system combined with video surveillance in accordance with the prior art, including a sample event table to give an example sequence of events for such an alarm/video surveillance system in operation.

FIG. 2 shows the door 54 as comparably shown by FIG. 1, under the monitoring of a sensor 62 linked with the inventive control panel (only one sensor shown of what typically would include many). The drawing shows the sensor and control panel hardwired together, although FIG.

5 will show an alternate embodiment where the sensor and control panel communicate by radio.

Video surveillance is achieved by the digital camera unit 104, such as what are available from for example, SONY® and others. The digital camera unit comprises a charge-coupled device (CCD) 110 feeding a digital signal processor, identified as video signal processing 112 in the drawing. The camera unit incorporates a processor 114 with memory for various processing functions described more particularly as follows. The camera unit also includes a "mass" storage device 116 which, despite being generically referred to as "mass," may provide only a modest amount of storage capacity. The mass storage device may comprise one (or just a portion of one) chip, or alternatively multiple chips, or else perhaps a local disk or drive. The mass storage device provides for storage of server and communication software, and perhaps optionally for database storage of limited amounts of video data. The camera unit can be linked to a network by the provision of a network card 118 or the like, and also has various output functions 120 including significantly, the drives for the pan, zoom, tilt (PZT) functions.

The inventive control panel is shown in an abbreviated format. What is shown includes a processor and memory 122, a network card 124, an interface and card 126 for processing sensor signals, as well as its own mass storage device 128. The control panel's mass storage device likewise provides storage for programming including browser software as well as providing storage for data. Additionally, the mass storage device provides storage for server software as will be more particularly described below in connection with FIG. 4. Whereas the mass storage aspect is again referred to as a "device," it might actually be realized as a set of chips instead of a single (or portion of one) chip, or else a disk or drive (or tape and so on).

An inventive aspect of this FIG. 2 inter-networking configuration includes attaching the camera unit and control panel on a network 121-23. FIG. 2 shows the camera unit and control panel linked to the same segment 121 of a LAN 122 (ie., local area network). In a preferred embodiment of the invention, the LAN comprises an Ethernet® network segment 123 having predominantly a bus topology. However, the invention could be achieved using other network protocols configured in other topologies including ring, star, and/or combinations of any of bus, ring or star topologies. The camera and/or control panel might actually link to the LAN segment at a point of access 125 by means of, among other means, a hub. Whereas the drawing shows just one device attached to each point-of-access or hub 125 on the bus 123, it's more likely that this particular camera and control panel would hang off the same hub. The camera and control panel (or a connected input device like a card reader or keypad, not shown) would likely be physically relatively close together since both are close to the door:—ie., the camera to view it, and control panel (or more simply the input device, not shown) to afford a walk-in party the opportunity to walk over to the control panel (or the input device as card reader or keypad and so on) within the allotted delay time (eg., 20 seconds or so). Hence for convenience sake, the camera and control panel (as well as, though not shown, the various other of the array of cameras and input devices serviced by the control panel) can attach to the LAN by the same hub 125 (although this is not shown).

What the drawing shows as a LAN segment 123 might more simply represent one entire LAN. However, denoting the LAN segment 123 as such a segment 123 accommodates clustering. For example, if this LAN segment is owned by a geographically distributed banking enterprise, the bank might distribute its inter-networking configuration to cluster together certain sub-units of its operation. That is, a given bank lobby and its proximate ATM machines (not shown) might be networked by the LAN segment 123 as shown, the larger banking enterprise within a metropolitan area might tie in several LAN segments into one LAN (eg., 122), the bank's LAN's across the nation being networked together in a WAN (ie., wide area network, again, 122), all which might interface at several points with the Internet global computer network 121.

The camera unit 104 is provided with server-implemented communication abilities. The control panel 102 is provided with complementary browser-implemented communication abilities. Briefly stated, the camera and browser can communicate with each other over the network 121-23. Also, since the video data is digital, the video data can likewise travel over the network 121-23 rather than over special co-axial cables. Hence both the video data as well as message data travel over the same pathway, ie., the network paths 121-23. Moreover, the control panel can store a certain amount of the video data onboard in its own mass storage device 128. The control panel 102 need not have a video tape recorder. A further advantage is that the control panel can be provided with analysis software that captures frames, and then perhaps "analyzes" or compares an earlier to a frame for differences, ie., which corresponds to motion detection analysis.

Referring back to the event table of FIG. 1, a comparable sequence of events might transpire with the FIG. 2 system in accordance with the invention as follows. At an original time, the door 54 is closed. At event no. 1, the door opens, and the sensor 62 signals the control panel 102. At event no. 2, the control panel responds by counting down the delay time as well as requesting the camera 104's server to serve browser-formatted video data to the control panel. If no appropriate password is inputted by the end of the delay period, then the situation has evolved into a prospective unauthorized intrusion. The control panel can signal any "guard" 105-08, wherever he or she may be found, of the unwanted intrusion.

This FIG. 2 configuration of an alarm system changes the whole paradigm of a "guard" shack. A "guard" 105-08 can effectively perform his or her duty wherever access may be had to a browser-implemented machine. FIG. 2 shows several possibilities among others. There may actually still be a guard "shack" or post 105 somewhere within the ambit of the same LAN segment. Alternatively, the guard may be any remote user 106-08 alerted by the control panel's signal from anywhere on the wider network including from the dominant LAN 122 or the WAN 122 or the like. The "guard" may be physically found about anywhere. A further inventive aspect of this configuration is that a "guard" 105 (say, in the guard post) and another user (any of 106 through 108) in a remote other location might concurrently submit browser requests to the camera 104's server for video. This allows concurrent analysis by the guard 105 on the spot as well as a relevant party 106-08 from further afield. More simply, it allows about any combination of relevant parties 105-08 to access the camera 104's and control panel 102's data from about anywhere.

FIG. 2 shows the following other remote users. FIG. 2 shows an instance of the bank (ie., the subscriber) having its own chief security authority 106 (as, eg., in a headquarters building elsewhere) connected by the bank's Intranet or WAN 122. The bank may also subscribe to a private service 107 for alarm monitoring services, which may be connected by its own Internet Access Point directly to the Internet backbone 121. In fact, this configuration supports numerous other remote users 108 (one shown), one which for example might be the bank's chief security officer 108 who, from his home at night as linked to the Internet 121 by a Point-of-Presence provider 129 as shown, joins the action with the guard 105 and/or other staff 106/107 in analyzing the available data. Simply put, once the data is served vis-a-vis the point-of-access 125 to the network 121-23, the data can be browsed from about anywhere.

Figure 3:
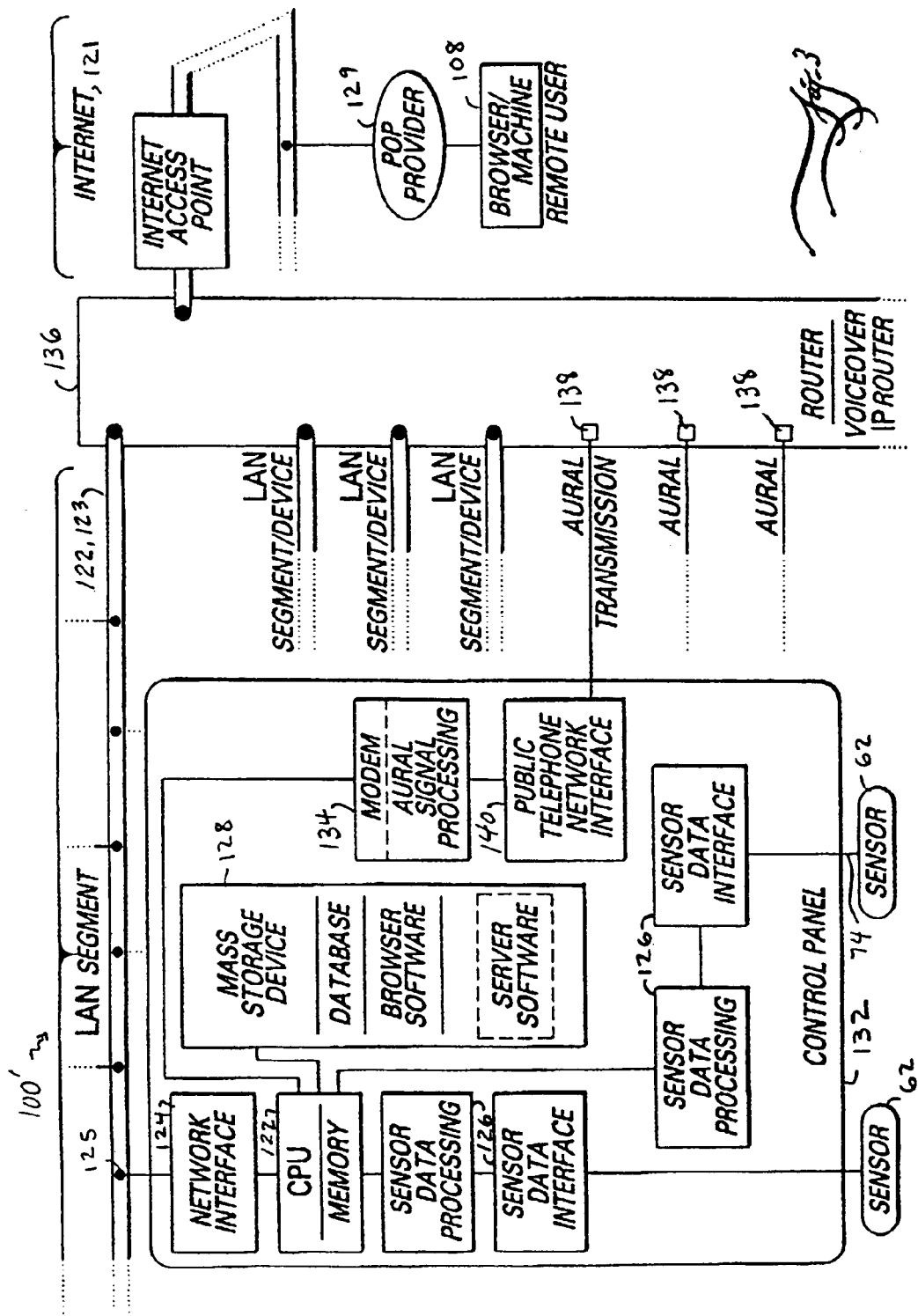
FIG. 3 is a diagrammatic view of communication path integrity supervision in accordance with the invention in a network system for alarm system data communication.

FIG. 3 shows a variant of the FIG. 2 configuration. In FIG. 2, all the message communication is presumed to transpire in accordance with one network protocol or another. For example, the LAN protocol might be formatted by an Ethernet® protocol while other parts of the transmissions would more likely take the format of IP and/or IP/TCP protocol(s), which is especially likely for Internet transmissions. However, within the alarm system industry, alarm message communication has formerly been handled predominantly by standard voice-grade telephone lines.

More to the point, there are thousands upon thousands of control panels already in existence, installed and in use around the country that operate predominantly by means of standard voice-grade aural communications, whether actually transmitted over landlines or by cellular links. Commonly-owned, commonly-invented U.S. Pat. No. 6,040,770—Britton, and its co-pending continuation, U.S. application Ser. No. 09/524,166, filed Mar. 13, 2000, discloses various schemes of integrity supervision for alarm data communication. In the ordinary case, such alarm data communication is formatted for voice-grade aural communications, whether by landlines, cellular links or other long-range radio links.

FIG. 3 shows the merging of voice-grade aural communications with IP telephony equipment. FIG. 3 shows an alternative embodiment 132 of the control panel 122 shown by FIG. 2. Whereas this control panel 132 has a network card 124 and point-of-access 125 connection to the LAN segment 123 as shown by FIG. 2, this control panel 132 retains the standard aural processing circuitry 134 that has long been used by the industry.

The control panel 132 is connected to a router device 136 which includes interfaces 138 for voice-grade aural transmissions. This router device 136 is further of the type that implements IP telephony. Such routers are provided by many OEM's including by way of non-limiting example the products of Cisco Systems, Inc., which utilize the Cisco AVVID architecture (ie., architecture for voice, video and integrated data). See, for example, http://www.cisco.com/warp/public/779/largeent/avvid/products/infrastructure-.html.

That way, the alarm data communication over the network 121-23 can dispense with the control panel 132's network card 124 and rely instead on the connections out of the control panel 132 from the public-telephone-network interface 140. Instead of plugging into the public telephone network, the control panel 132 is linked to the telephony ports 138 on the voiceover IP router 136 by a phone wire 142 out of the public-telephone-network interface 140. A remote user 108 having a browser can communicate over the Internet with the control panel 132, all as by means of IP telephony. Hence, the aural transmissions of the control panel 132 are in fact transmitted over the Internet 121 in browser format. However, the remote user 108's browser software decodes the browser format back into aural transmission format. Hence the remote user 108's machine can utilize the integrity supervision protocols disclosed by the above-referenced patent disclosure(s) of Britton.

Hence the FIG. 3 arrangement(s) $100^1$ provide(s) the following advantages. Long distance telephone charges over the Internet are cheap, compared to calls over telephone lines or cellular links. One aspect of the integrity supervision (eg., as disclosed by the above-referenced patent disclosures of Britton) involves periodic communications to or from the dispersed control panels to check each panel's present capability of sending alarm signals. The cost of long distance tolls can be costly over the public telephone network. In fact, sometimes the integrity supervision scheme is designed to wait long periods between check-in calls in order to economize on long-distance tolls. However, with cheap long distance over the Internet, there is no longer any need to keep the check-in messages infrequent. Indeed this encourages having the check-in messages checking "in" more frequently because greater frequency equates with superior integrity assurance.

Also, the FIG. 3 arrangement $100^1$ merges the advantages of having the Internet 121 carry the alarm data communications with the fact that the much of the existing control panels already out in the field are not network-card enabled but, reliant on aural transmission technology 134/140. Briefly stated, FIG. 3 merges aspects of the new (eg., the Internet 121 or networking protocols 122-23) with aspects of the old (eg., aural transmission formats 134/140).

Figure 4:
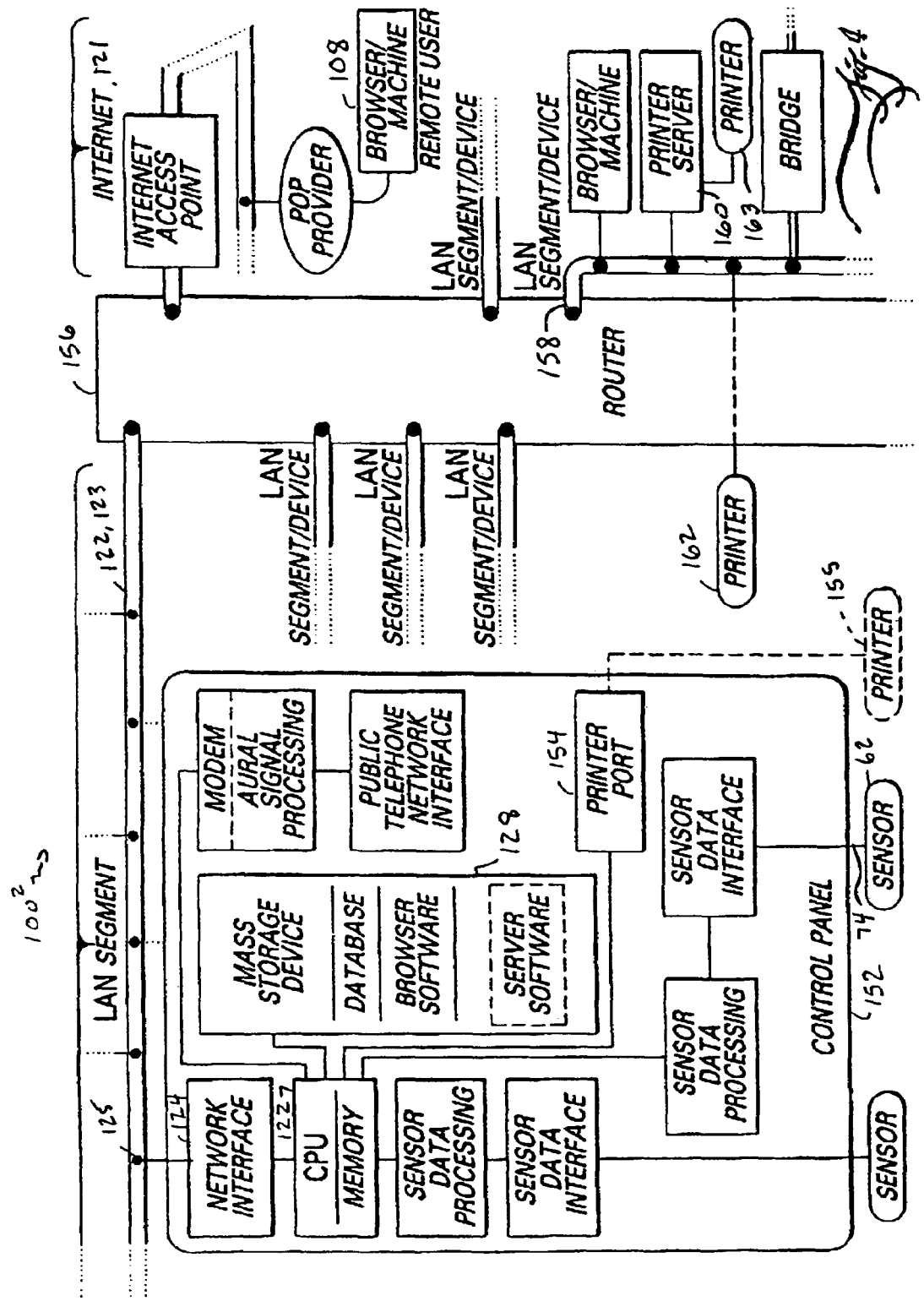
FIG. 4 is a diagrammatic view of an inter-networking configuration of an alarm system for report printing facilities in accordance with the invention as well as control panel programming in accordance with the invention.

FIG. 4 shows inventive aspects relating both to report printing as well as control panel programming. In regards of report printing first, to date, various control panels are configured with a printer port.

The control panel 152 shown by FIG. 4 has such a printer port 154. Its printer port 154 allows a direct wire connection to be extended to a nearby printer 155 for report printing purposes. However, this control panel 152, being comparable to the FIGS. 2 and 3 control panels 102 and 132, is provided with network interface 124. The control panel 152 is linked by point-of-access or hub 125 to the LAN segment 123. The LAN segment 123 includes a terminus in a router 156. For sake of illustration, the router 156 is shown having all manners of network devices and/or segments hanging off it. More relevant to the present description of printer utilities, the router has another LAN segment 158 extending off it which links to both a printer server 160 in one instance as well as a stand-alone printer 162 in another instance. Given the foregoing, the report printing transmissions for any given control panel 152 on the network 121-22 can be routed over the network 122-23 to any network printer 162-63. Hence the foregoing obviates the need of directly linking each control panel 152 to a printer (eg., 155) by the printer port 154 on the control panel 152. Hence the printer 155 that is directly connected to the control panel 152 is no longer necessary. Accordingly, this printer 155 is shown in dashed lines in the drawing for this reason.

To return to the matter of control panel programming, the control panel 152 is configured with server software as well as browser software. The prior art way of programming a control panel has involved the following. Perhaps a laptop computer (not shown) was brought to the control panel and connected to it by a serial port. The producer/manufacturer of the control panel might likely provide proprietary software for programming the control panel. Such proprietary software would be installed on the laptop. From the laptop, a user would program the control panel. Control panel programming would address the following matters. For example, with reference to FIG. 2, the control panel 102 might be programmed with the instruction that 'once entry has been detected through the front door, delay twenty (20) seconds before branching to the next action.' Certainly the portion of that instruction regarding the twenty (20) second delay can be changed to other values by programming. Another instruction might recite in effect, in the absence of an intervening input of a valid password, the next action will be both send a transmission to a certain receiver site 108 as well as sound a siren.' Other instructions would include the establishment of user accounts, passwords and codes and the like, and so on. In the drawings, no such laptop is shown.

An inventive aspect of the FIG. 4 arrangement 100$^2$ is that it eliminates the need for physically transporting a laptop or other portable device to the control panel 152 for programming. The programming tasks can be achieved by the remote user 108 who through his or her browser has the control panel 152's server serve its settings to the user 108. The user 108, if authorized, can then change the settings or programming of the control panel 152. Again, the foregoing is achieved by installing the control panel 152 with server software. It turns out that the memory 128 and processing 122 requirements for handling the server software is surprisingly small. The server package is transparent to both the relatively latest versions of NETSCAPE NAVIGATOR® and MICROSOFT IE® browsers. However, the server package is not elaborate, and utilizes the least common denominator factors in its composition to keep things simple and as shown and described more particularly next in connection with FIGS. 6 through 8.

Figure 6:
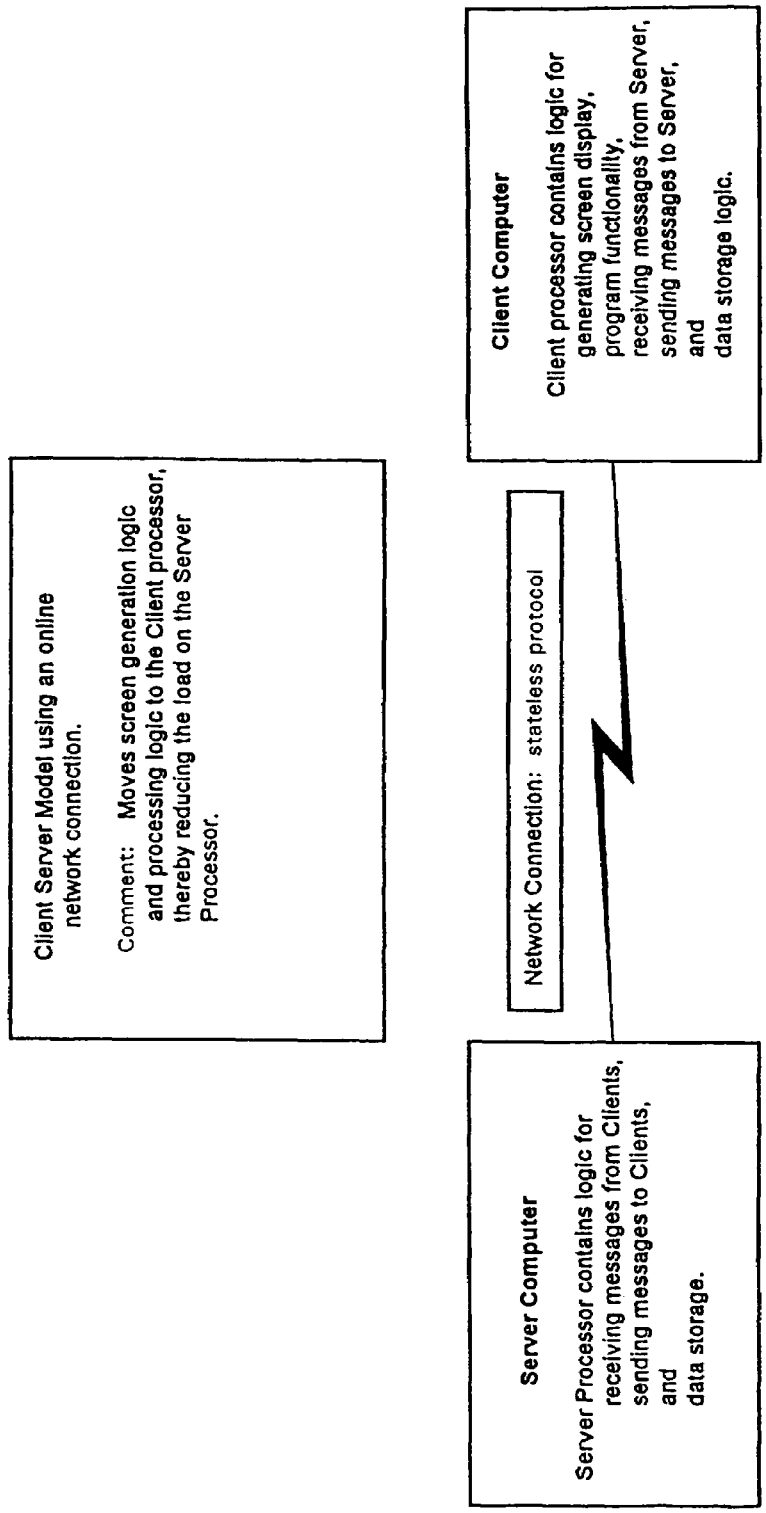
FIG. 6 is a block diagrammatic view of the client/server model in accordance with the prior art for network communications between server(s) and client(s) in a stateless communications-transfer protocol such as famously implemented by the World Wide Web.

FIG. 6 is a block diagrammatic view of the client/server model in accordance with the prior art for network communications between server(s) and client(s) in a stateless communications-transfer protocol such as famously implemented by the World Wide Web. FIG. 7 is a table of server-side CPU activities in accordance with the prior art for a server participating in the prior art client-server model of network communications in a stateless communications-transfer protocol (eg., the Web) as shown by FIG. 6. FIG. 8 is a corresponding table of client-side CPU activities in accordance with the prior art for a client participating in the prior art client-server model of network communications in a stateless communications-transfer protocol (eg., as the Web).

As well understood by those skilled in the art, computers communicating over the World Wide Web ("Web") do so by browser technology and in an environment described as a "stateless" or non-persistent protocol. "Intranet" generally refers to private networks that likewise implement browser technology. "Internet" generally includes the Web as well as sites operating not on browser-technology but perhaps maybe servers of mail or Internet chat and the like. At least in the case of the Web, the stateless protocol is denominated as Hypertext Transfer Protocol ("HTTP").

One premise of the Web is that material on the Web may be formatted in open or "public domain" formats. These principally include to date for Web-page matter the languages or formats of HTML (hypertext markup language), SGML (standard generalized markup language), XML (extensible markup language), XSL (extensible style language), or CSS (cascading style sheets). Many if not most of these open formats are produced under the authority of W3C, which is short for World Wide Web Consortium, founded in 1994 as an international consortium of companies involved with the Internet and the Web. The organization's purpose is to develop open standards so that the Web evolves in a single direction rather than being splintered among competing factions. The W3C is the chief standards body for HTTP and HTML and so on.

On the Web, all information requests and responses presumptively conform to one of those standard protocols. Another premise of the Web is that communications vis-a-vis requests and responses are non-persistent. A request comprises a discrete communication which when completed over a given channel is broken. The response thereto originates as a wholly separate discrete communication which is afforded the opportunity to find its way to the requestor by a very different channel.

FIG. 6 shows aspects of the prior art client/server model for network communications between a server and a client. Those ordinarily skilled in the art well understand that this prior art model takes advantage of distributed computing on a large even global scale. This involves a network of user machines (PC's, laptops, even microprocessors) connected via moderate bandwidth, low-latency networks which as a whole cooperate as a computing platform. The goal has been to take advantage of a large resource pool of machines comprising hundreds of gigabytes of memory, terabytes of disk space, and hundreds of gigaflops of processing power that is often idle. This paradigm in computing was expected to impact the fundamental design techniques for large systems and their ability to solve large problems, service a large number of users, and provide a computing infrastructure. Hence substantial amounts of screen generation logic as well processing and data manipulation logic is moved onto the user machines. This reduced the load on the server processor by distributing the processing load among the users.

FIGS. 7 and 8 show that much of this functionality is implemented by software-object libraries store the Dynamic Link Library objects (eg., DLLs). For example, on a Microsoft® operating system, these objects take the *.dll extension. DLLs provide a call to oft-used functionality. Microsoft provides standardized packages of DLLs in order to provide a consistent computing platform between machines transferring communications over a network.

FIG. 7 provides a table of prior art server-side CPU activities for a server practicing the prior art client/server model for network communications of FIG. 6. Activity 102 recites that a minimal operating system gets loaded into secondary memory (eg., hard-drives) by processes that use DLL's. Activity 110 recites that the application program undergoes a first-stage compile process calling to produce a first-stage object with DLL references, which gets stored on secondary memory.

FIG. 8 provides a table of prior art client-side CPU activities for a client participating in the prior art client/server model for network communications of FIG. 6. Activity 219 recites that the requested first-stage object with DLL references undergoes a second-stage compile/interpretation process to derive an object and references to the DLLs* on the client machine. The DLLs* on the client machine are asterisked because there are potential differences between the DLLs on the server and the corresponding DLLs* on the client machine. Activity 220 recites that the client machine executes the derivative code so derived.

In general, in cases if the client is any of the parties 105 through 108 of FIG. 2 (eg., guard shack 105 and/or any of the other alarm-monitoring parties 106-108), then the client is able to communicate with a server (for example either the control panel 102 or camera unit 104) by doing the following. Briefly stated, the client connects to the server machine (eg., control panel 102 or camera unit 104) and:

requests the server's data on the prospective alarm event,
performs observation and analysis activity, and
enters results of the analysis.

More particularly, the CPU of the client (eg. guard shack 105 and/or any of the other alarm-monitoring parties 106-108 of FIG. 2) will:

connect to server/camera, accept keystrokes/mouse inputs (ie., there from the client's machine), analyze for forming a request, transmit the request to the server/camera, receive the First-stage Object and referenced DLLs, receive the requested data, execute the Second stage compile/interpretation of the object and referenced DLL's, develop the screen and screen content display the developed screen, accept further keystrokes/mouse inputs (again, from the client's machine), analyze keystrokes/mouse inputs, and either build another different screen, or Transmit a request to server/camera for additional Data and First stage objects and DLL references, and so on continuing the process.

All of the above example could be executed with two or three requests to the Server CPU (depends on program design). All the above activity preferably takes place within the Client CPU. That way, the server gets by on operating on a limited operating system and other programming functionality/instruction set.

Figure 5:
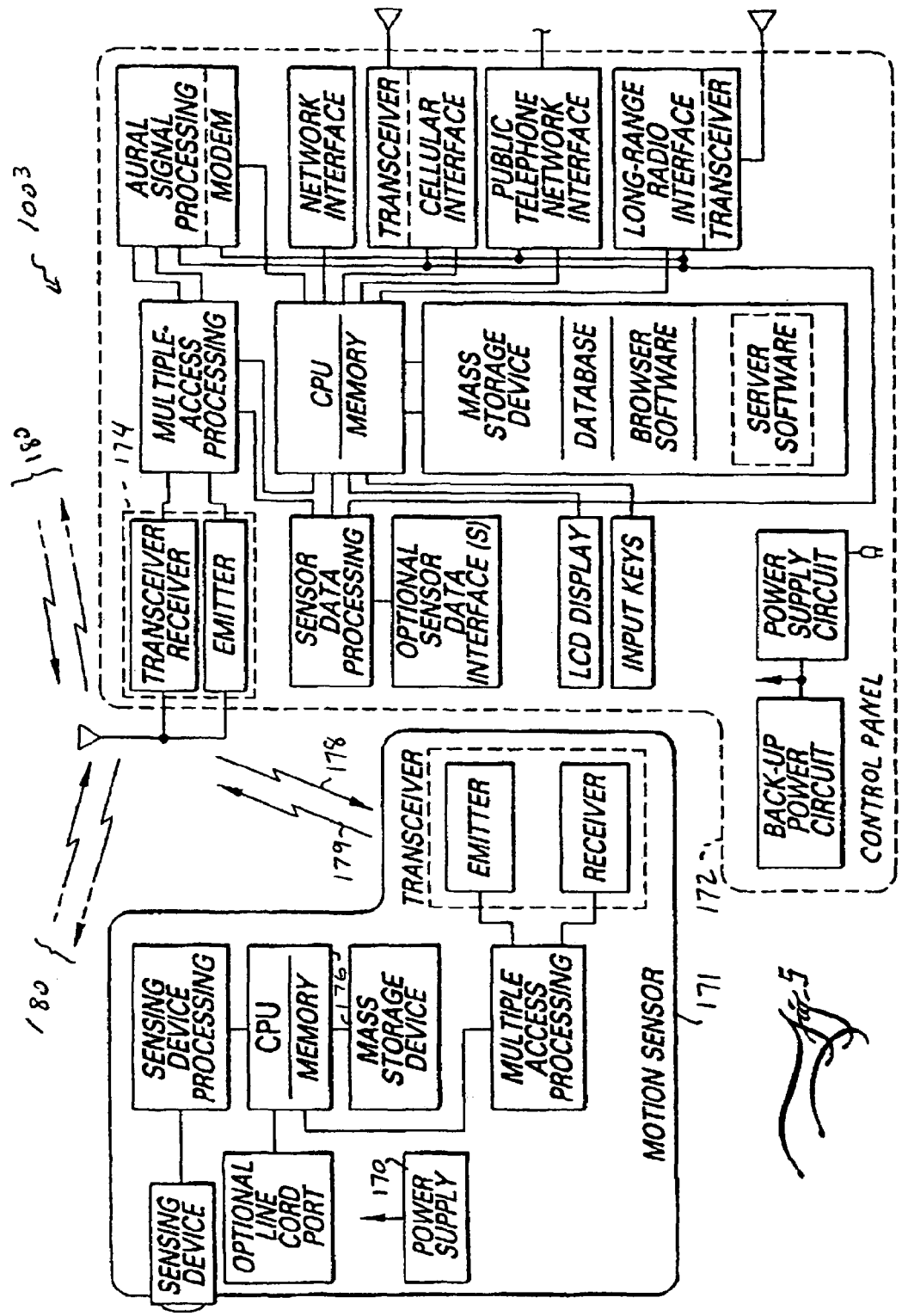
FIG. 5 is a diagrammatic view of communication path integrity supervision in accordance with the invention between a control panel and a battery-powered sensor.

FIG. 5 shows a further aspect $100^3$ of the invention. In the past, communication between any of the sensors and their dominant control panel has been configured for radio. However, this has been limited to one-way transmission from the sensor to the control panel. One reason to use a radio link was to eliminate the need for a physical wire 74 to extend between the sensor 62 and control panel 102. A related development with this was to power the sensor off batteries 170. That way, such a battery-powered sensor 171 was entirely independent of wiring either to the control panel 172 or to public utility power.

However, as stated, to date there has only been one-way transmission from the sensor to the control panel. Thus, the state of matters may be referred to as one-way wireless transmission in a battery-operated unit. An advantage of this includes that such battery-operated sensors are miniature and can be placed in the most hidden away locations.

A disadvantage has been found with the following. The greatest drain on the battery occurs with transmission. The present preferred mode of one-way transmission has the sensor sending its signal perhaps as many as twenty (20) times in a row to insure that the control panel received the signal.

The invention $100^3$ in accordance with what is disclosed by FIG. 5 provides two-way wireless transmission between the sensor 171 and control panel 172. The control panel 172 shown by FIG. 5 is comparable to the version 152 shown by FIG. 4 except including among other things, a transceiver set 174 of a receiver and emitter for radio communication with the sensors (only one sensor 171 shown in the drawing). Additionally, the sensor 171 is provided with a minimal amount of processing power 176. This enables the sensor 171 to respond to low-level programming instructions. The foregoing will be more particularly described next.

Thus two-way transmission provides multiple advantages. For one, the control panel 172 can feed back the sensor 171 a "received" signal 178 when indeed a sensor's signal 179 is received. The "received" signal 178 can signify the sensor 171 to stop. That way, the sensor 171 need not re-transmit a signal 179 twenty (20) times in a row blindly, not ever knowing if the control panel 172 got the signal 179 on the first transmission, if at all. Presumptively, the control panel 172 will indeed receive the signal 179 in the first set of transmissions or so. Hence the sensor 171 will be stopped from wasting its battery power on many redundant needless transmissions of signal 179. Consequently, this will prolong the use life of the battery 170.

Furthermore, the control panel 172 can download various programming instructions to the sensor 171. For example, the control panel 172 might instruct the sensor 171, as in pseudo-code, 'front door sensor 171, we are disarmed until notified next' (eg., for the duration of business hours or the next nine (9) hours or so). Then later, the control panel 172 would likely re-instruct the sensor 171, again in pseudo-code, 'front door sensor 171, we are now armed, so check-in on a regular schedule of every ten (10) minutes.' No doubt the nine (9) hours of downtime saves the life of the battery 170. Alternatively, the control panel 172 might recite to a different sensor (no other sensor shown, although various other radio links 180 are shown), 'you are a fire detector, so call back with a check-in message each minute.' Those are just examples of the various matters likely to be addressed between the control panel 172 and its dependent sensors 171.

Therefore, the two-way wireless transmission both provides the control panel 172 with more intelligent management of its dependent sensors 171's battery resources.

FIG. 9 shows an inventive method and devices therefor for optimizing the position where a wireless sensor 242 in accordance with the invention is installed or mounted with respect to a base unit 250, comprising an alarm control-panel 252 enhanced with radio-communication(s) functionality (eg., and as indicated by reference numeral 254), by way of either an attached device or incorporated circuitry.

For general interest, a single control panel 252 is likely in service of multiple locally-distributed sensors 242 or 243 of differing types (only two shown for convenience of illustration sake, eg., 242 and 243). Examples differing types of sensors include without limitation smoke, flame, heat, glass-break, motion, access and so on. Additionally for general interest, a control panel 252 is typically one of a large population of communicators in communication with one or more central monitoring station(s) 258, although the drawing for simplicity sake shows a merely one control panel 252 and one central monitoring station 258 in communication over some generic communications path.

Referring more particularly to FIG. 9, it shows an installer 260 in the process of installing a wireless sensor 242 provided with 2-way radio capability (eg., and as indicated by reference numeral 268). It is an aspect of the invention to optimize within a narrow set of factors the installation position of the sensor 242 in order to improve signal reception strength at the opposite side of the radio path 264. In situations where the sensor's transmitter (ie., the transmitter of sensors 243) is too weak to send signals to the control panel 252's radio base 254, then it is known to utilize intermediary devices, referred to as repeaters 270, to give the transmission a hop on its way back and forth between the control panel 252's radio base 254 and sensors (in particular, sensor 243 as shown in the drawing). Repeaters 270 may operate solely on battery power or include a battery back-up for situations of utility-power failure. Nevertheless, even with the use of repeaters 270, positioning a sensor (and as being shown in connection with sensor 242) for best signal strength is still a worthwhile consideration to pursue during the original installation. There are several reasons to be mindful of signal strength. One, the information that the sensor 242 or 243 passes back to the control panel 252 might on any given occasion be crucial. Also, the sensor 242 or 243 might be solely battery-powered, not redundantly connected to utility power as well, and hence to extend battery life the onboard signal sending power is likely to be relatively weak. (In contrast, the control panel 252's radio base 254 will be much more robust.) Additionally, among several suitable sites to mount a sensor 242 which all afford the sensor 242 physical connection or proximity to the given premise it is sending information on, several of such suitable sites might be unsuitable for radio path 264 reasons.

To expand on that last point, an installer 260 might prefer to mount a sensor 242 on a given place on a wall, ceiling, or corner therebetween, except that some structural building material somehow blocks good radio coupling between the sensor 242 and the control panel 252's radio base 254. In contrast, if the installer 260 moves the sensor 242 anywhere from a few inches to a few feet, then experience has shown that radio coupling between the sensor 242 and the control panel 252's radio base 254 can be greatly improved.

The problem before the invention has been, how does the installer 270 know. It is an object of the invention to afford the installer 270 the self-opportunity to test radio reception strength, as many times as desired, and in so doing move the sensor 242 around to several candidate positions and thereby optimize installation position in view of received-signal strength.

That is, for installation purposes, the sensor 242 is provided with a test switch 272 (eg., button) and an indicator system 274. The test switch 272 allows the installer 260 to initiate a test communication 276. The indicator system 274 provides the installer 260 with some sensible indication that corresponds to signal strength. A preferred indicator system 274 comprises a single LED which is activated by the sensor 242's onboard processing circuitry to blink in different patterns according to signal strength. The preferred indicator 274 system notwithstanding, a sufficient indicator system might be implemented by various other user-sensible devices including and without limitation audible tones and the like.

What follows is a non-limiting example sequence of events that an installer 260 might practice in accordance with the invention in order to optimize installation position of the sensor 242. FIG. 9 shows the installer 260 starting with the sensor 242 disposed in an original position (for which the sensor 242 is shown in solid lines). By means of the test switch 272, the installer 260 activates a test communication 276. The sensor 242 sends a test signal 276 into space, including at least the carrier band (eg., ~900 MHZ), and perhaps modulated and/or encoded with a message, such as corresponding to informing the control panel 252 that this signal is a test signal 276 for installation purposes. Assume that the control panel 252 indeed receives the test signal 276 (ie., the sensor 242 is not out of range or totally blocked). The control panel 252 measures the strength of the received test signal 276. The alarm panel 252 next ranks the relative strength of the received signal 276 against some arbitrary scale of best to worst. That is—even though the scale might be arbitrary—the design and engineering behind the specifying thereof and the worthwhileness of such scale after specification are indeed significant. It is preferred if the scale assigns values in the range between one (1) to fifteen (15), one being worst value to be assigned, fifteen being the best value to be assigned. A scale between one to fifteen affords ease of processing for the sensor 242, which might have a sixteen-bit processor, or perhaps an eight-bit processor working the value as a two-word string.

To review, the control panel 252 has (i) received the test signal 276, (ii) understands that it is a test signal 276, (iii) measures the received signal 276's strength, and (iv) assigns a value to the received signal 276's strength that correlates relative strength according to some specified scale. Given that much, the control panel 252 responds with an acknowledgment signal 278. That is, the control panel 252 sends the acknowledgment signal 278 into space, including at least the carrier band (eg., ~900 MHZ), and then also modulated and/or encoded with a message that includes the assigned value for the received test signal 276 that corresponds to reception strength.

Assume that, in the scale from one to fifteen, the control panel 252 rated the test signal 276 an eight (8). The control panel 252 informs the sensor 242 of the eight (8) assignment with return of the acknowledgment signal 278. The sensor 242 presumably receives the acknowledgment signal 278 and begins evaluating it in much the same fashion as the control panel 252, such as measuring the strength and assigning a value from the same scale corresponding to reception strength. Let's assume further that the sensor 242 assigns a value of twelve (12) to acknowledgment signal 278's received strength. Presumably the values will be asymmetric like this and in favor of the control panel's radio base 254 because it is more robust than the minimized circuitry utilized by the sensor 242. At this stage, the sensor 242's processing circuitry knows that the outgoing signals 276 are received at an eight (8) value while the incoming signals 278 are received at a twelve (12) value. The weak link is the outgoing signal 276, hence the sensor 242's processing circuitry rates the connection from that position overall as an eight (8).

An important function which remains for the sensor 242 to do is to indicate to the installer 260 what the overall rating is for the position. A preferred way of accomplishing this is to have the sensor 242 blink the LED (eg., 274) once for all values in the range between and including one (1) and five (5), blink it twice for all values in the range between and including six (6) and ten (10), blink it three times for all values in the upper range over ten (10).

In spite of the foregoing lengthy description, all this activity between operation of the test switch 272 and the LED 274's blinking (or not if no communication along one leg of the round-trip 264) transpires in an instance. To the installer 260, things happen fast. Test switch, and observe the indication. As said about FIG. 9, it shows the installer 260 having temporarily placed a sensor 242 in an original position for test purposes. The original position for the sensor 242 is shown in solid lines. As described, the installer 260 tested and got back an indication. Again, if the lowest rated value was an eight (8), the installer 260 is treated to two (2) blinks, and that's not bad. The general sentiments are that three (3) blinks is outstanding and two (2) blinks is good, while one (1) blink is maybe OK but at least a radio path 264 can be established.

FIG. 9 additionally shows that the installer 260 might displace the sensor 242 to a first alternate position (ie., $Alt_1$), test and compare the result, displace a second (and succeeding) alternative positions (eg., $Alt_2$ and so on), test and keep tally of results, and so on, until the installer 260 feels satisfied that he or she knows enough to make a satisfactory installation decision. Presumably, the installer 260 is going to balance the best results obtainable radio-wise against other factors that relate to the sensor 242's other functions besides communicating. Such as, perhaps the sensor 242 ought to be hidden, or alternatively in plain view, or in the highest elevation in a room for smoke detection purposes, or as close inside a sill for glass-break purposes and so on.

Given the advantages of the invention, an installer 260 can do this fast and efficiently without enlisting the help of a second person, using external measuring equipment, or walking endlessly to and from the control panel to get a read there.

Hence a premise-monitoring alarm system in accordance with the invention and as shown by FIG. 9 comprises the following aspects. It includes a base set 250, which comprises a package of circuitry and devices including a base transceiver 254 as well as a control panel 252 linked to the base transceiver 254. The alarm system further includes at least one remote set 280 (more likely, numerous remote sets, the two remote sets 280 and 281 shown in the drawing being representative of many), which comprises a package of circuitry and devices including a remote transceiver 268 as well as a sensor 242 fairly closely located to the remote transceiver 268. Preferably the sensor 242 is not radio linked to the remote transceiver 268 but instead is preferably linked by physical conductors 284 (eg., a non-radio link). The remote set 280 further includes a user-sensible indicator 274, and a user interface 272, both which are preferably not radio linked to the remote transceiver 268 but instead are preferably linked by physical conductors 284 (eg., a non-radio link).

Preferably the remote set 280 is configured to respond to a given user input, as inputted through the interface 272, with transmission of a test signal 276 through the remote transceiver 268. Correspondingly, the base set 250 is preferably configured to respond to reception of any within-range test signal 276 with sending a reply signal 278.

It is an aspect of the invention that the remote set 280 preferably responds to reception of a reply signal 278 with output of a user-sensible indication by the user-sensible indicator 274. That way, during installation, a single installer 260 can determine when the transceivers 254 and 268 are within range without help from additional persons or equipment. Hence the installer 260 can repetitiously test the remote transceiver 268 in various proposed installations within a confined remote perimeter, without ever having to desert area confined within the perimeter.

It is a preferred option if the base set 250 is further configured to receive as well as analyze any test signal 276 within range. That way, in further response, the base set 250 can encode the reply signal 278 with information based on such analysis. The remote set 280 is correspondingly further enhanced to decode the information in the reply signal 278 and then thereafter respond with an output through the user-sensible indicator 274 such a user-sensible indication that would convey or communicate that information to an installer 260. For example and without limitation, such information might correspond to the remote transceiver 268's sent-signal strength. Given the foregoing, during installation, a single installer 260 can advantageously determine the information (eg., such as remote transceiver 268's signal strength) without help from additional persons or equipment.

Preferably, what is lately being referred to as the remote set 280 (eg., it being remote from the control panel 252 and comprising an alarm-event sensor 242 and transceiver 268 therefor) is further configured to output, by way of through the user-sensible indicator 274, a user-sensible indication according to either one mode, whereby the user-sensible indication is automatically reset to a non-indication state, or else another mode, whereby reset to the non-indication state must be done manually. For example, in the case of the user-sensible indicator 274 comprising a blinking LED, the last blink of the LED may automatically switch to an OFF state, or in contrast remain in ON state until manually reset. For sake of another example, in the in the case of the user-sensible indicator 274 comprising a ringing tone, the last ring of the tone may automatically switch to an OFF (silent) state, or otherwise remain in ON (steady tone) state until manually reset.

It is another preferred aspect of the invention if the remote set 280 is further configured to encode the test signal 276 with a unique identifying code. For example, the test signal 276 might send the sensor 242's unique serial code. Correspondingly, the base set 250 is further configured with computer-implemented memory to store the code upon the first clear reception thereof as well as be further configured with a user interface 286 to allow the installer 260 to oppositely test the transmission between the remote and base sets 280 and 250 remotely away from the remote set 280. That is, given the following scenario, where the installer 260 has moved away from the remote set 280 that is being freshly installed, he or she now stands him or herself before the base set 250, then this is possible:—the installer can send a reverse or opposite test signal 278 to the remote set 280, and be informed of its reception by seeing or hearing the user-sensible indicator 274 from where he or she stands. If the remote sensor 280 is too far for that, then preferably if the remote set 280 will hold its user-sensible indication until manually reset, then the installer 260 can make the trip back to the remote set 280 and make personal determination if the reverse or opposite test signal 278 succeeded. The significant aspect of the unique code is, since the base set 250 likely communicates with numerous remote parties (eg., not only 280 but also 281 and so on), the unique code allows the installer 260 to address one and only one receiving party (eg., 280). That way, if the installer 260 is merely watching for a blinking LED or listening for a ringing tone in the distance, he or she won't mistake the response of a nearby remote set 281 because such a nearby remote set 281 won't have been addressed by the reverse or opposite test signal 278.

Further aspects of the invention include the following.

That is, given a premise-monitoring alarm system comprising a base set 250 having circuitry and devices including a base transceiver 254 and control panel 252, as well as a plurality of remote sets 280, 281 and so on, each having a unique identity and operative circuitry and devices including a remote transceiver (eg., 268) as well as an associated alarm-event sensor (eg., 242), then such further aspects of the invention allow the following.

Each remote set's (eg., 280's) operative circuitry and/or devices further comprise computer-implemented memory and an execution device cooperatively for storing a check-in propagation schedule and for propagating an on-schedule check-in message to the base set 250. This thereby self-empowers each remote set's (eg., 280's) ability to successively establish communication with the base set 250. The base set 250's circuitry and devices correspondingly further comprise computer-implemented memory and an execution device which in concert with that of the remote sets 280, 281 and so on, allows the system to share a check-in protocol which establishes the appointed times each remote set 281, 282 and so on, should propagate a succeeding check-in message. This way, the base set 250 monitors the check-in messages for any unmet check-in message according to the appointed time therefor, which would signify a troubled remote set 280, 281 or the like, that is troubled with inability to establish good communication with the base set 250.

It is an aspect of the invention that the system's check-in protocol further is configured to allow the base set 250 to determine when each remote set 281, 281 and the like, should propagate a check-in message as well as assign each remote set 281, 281 and the like, a different time slot. That way, the base set 250 reduces the likelihood any two remote sets 280 or 281 will try to check in at the same time.

Preferably the remote sets 281, 281 and the like, are battery-powered. In view of this, the base set 250's circuitry and devices preferably additionally comprise a signal strength detector for applying to transmissions (eg., 276) received from the remote sets (eg., 280). Therefore, the system's check-in protocol additionally affords the base set 250 opportunity to variously change the appointment schedule of the various remote sets 281, 281 and the like, according to the signal strength of each. For example, the base set 250 might extend out the appointed times between check-ins when the signal is strong, and conversely when weak, or vice versa.

Moreover, analysis by the base set 250 of each battery-powered remote set's signal strength the base set 250 the advantageous opportunity to estimate the remaining battery life for the each remote set 281, 281 or the like, as according to declining signal strength.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A premise-monitoring alarm system, comprising:
a base set having circuitry and devices including a base transceiver as well as a control panel linked to the base transceiver;
a remote set having circuitry and devices including a remote transceiver as well as a sensor being proximate and non-radio linked to the remote transceiver;
a user-sensible indicator and user interface being non-radio linked to the remote transceiver,
remote set being configured to respond to a given user input through the interface with transmission of a test signal through the remote transceiver;
the base set being configured to respond to reception of any within-range test signal with sending a reply signal;
the remote set responding to reception of a reply signal with output of a user-sensible indication by the user-sensible indicator, whereby during installation a single installer can determine when the transceivers are within range without help from additional persons or equipment and hence repetitiously test the remote transceiver in various proposed installations within a confined remote perimeter without deserting said perimeter.

2. The system of claim 1 wherein:
the base set is further configured to receive as well as analyze any test signal within range and, in further response, encode the reply signal with information based on such analysis; and
the remote set is further configured to decode the information in the reply signal and further respond with output through the user-sensible indicator a user-sensible indication which communicates the information, whereby during installation a single installer can determine the information without help from additional persons or equipment.

3. The system of claim 2 wherein:
said information corresponds to the remote transceiver's sent-signal strength.

4. The system of claim 2 wherein:
said user-sensible indicator comprises one of a visible device or an audible device.

5. The system of claim 1 wherein:
the remote set is further configured to output through the user-sensible indicator according to either one mode whereby the user-sensible indication is automatically reset to a non-indication state or else another mode whereby reset to the non-indication state must be done manually.

6. The system of claim 1 wherein:
the remote set is further configured to encode the test signal with a unique identifying code;
the base set is further configured with memory to store the code upon first reception thereof as well as is further configured with a user interface to allow the installer to oppositely test transmission between the remote and base sets remotely away from the remote set, selectively by the unique code.

7. The system of claim 6 wherein:
the remote set is additionally configured to provide a user-sensible indication of the opposite test transmission by the user-sensible indicator.

8. A combination remote transceiver and base transceiver in a premise-monitoring alarm system, comprising:
a remote transceiver non-radio linked to a sensor;
a base transceiver linked to a control panel;
a user-sensible indicator and user interface being non-radio linked to the remote transceiver,
remote-transceiver circuitry and devices non-radio linked to the remote transceiver and responding to a given user input through the interface with transmission of a test signal through the remote transceiver;
base-transceiver circuitry and devices being linked to the base transceiver for receiving any test signal within range and, in response, sending a replay signal;
the remote-transceiver circuitry and devices responding to reception of a reply signal with output of a user-sensible indication by the user-sensible indicator, whereby during installation a single installer can determine when the transceivers are within range without help from additional persons or equipment and hence repetitiously test the remote transceiver in various proposed installations within a confined remote perimeter without deserting said perimeter.

9. The combination of claim 8 wherein:
the base-transceiver circuitry and devices are further configured to receive as well as analyze any test signal within range and, in further response, encode the reply signal with information based on such analysis; and
the remote-transceiver circuitry and devices are further configured to decode the information in the reply signal and further respond with output through the user-sensible indicator a user-sensible indication which communicates the information, whereby during installation a single installer can determine the information without help from additional persons or equipment.

10. The combination of claim 9 wherein:
said information corresponds to the remote transceiver's sent-signal strength.

11. The combination of claim 9 wherein:
said user-sensible indicator comprises one of an visible device or an audible device.

12. The combination of claim 8 wherein:
the remote-transceiver circuitry and devices are further configured to output through the user-sensible indicator according to either one mode whereby the user-sensible indication is automatically reset to a non-indication state or else another mode whereby reset to the non-indication state must be done manually.

13. The combination of claim 8 wherein:
said base-transceiver circuitry and devices include the control panel.

14. The combination of claim 8 wherein:
said remote-transceiver circuitry and devices include the sensor.

15. The combination of claim 8 wherein:
the remote-transceiver circuitry and devices are further configured to encode a test signal with the non-radio linked sensor's unique serial code;
the base-transceiver circuitry and devices are further configured with memory to store said sensor's unique serial code upon first reception thereof;
the base-transceiver circuitry and devices are further configured with a user interface to allow the installer to oppositely test transmission between the remote and base transceivers remotely away from the remote transceiver and remote-transceiver circuitry and devices, selectively by the unique serial code.

16. The combination of claim 15 wherein:
the remote-transceiver circuitry and devices are additionally configured to provide a user-sensible indication of the opposite test transmission by the user-sensible indicator.

* * * * *

UNITED STATES PATENT AND TRADEMARK OFFICE
CERTIFICATE OF CORRECTION

PATENT NO. : 7,239,236 B1
APPLICATION NO. : 10/919027
DATED : July 3, 2007
INVENTOR(S) : Rick A. Britton et al.

It is certified that error appears in the above-identified patent and that said Letters Patent is hereby corrected as shown below:

On the title page, Item (76) Inventor, should read as follows:

--Rick A. Britton, Leawood, KS (US); Kyle Heironimus, Springfield, MO (US)--

Signed and Sealed this

First Day of January, 2008

JON W. DUDAS
*Director of the United States Patent and Trademark Office*